(12) United States Patent
Gooding et al.

(10) Patent No.: US 11,174,407 B2
(45) Date of Patent: Nov. 16, 2021

(54) PHOTOSENSITIVE PRINTING COMPOSITION

(71) Applicant: Qingdao Xin Shi Gang Technology Industry Co Ltd, Qingdao (CN)

(72) Inventors: Justin Gooding, Queens Park (AU); Parisa Khiabani, Sydney (AU); Alexander Hertanto Soeriyadi, Chatswood (AU)

(*) Notice: Subject to any disclaimer, the term of this patent is extended or adjusted under 35 U.S.C. 154(b) by 88 days.

(21) Appl. No.: 16/081,200

(22) PCT Filed: Mar. 1, 2017

(86) PCT No.: PCT/AU2017/050181
§ 371 (c)(1),
(2) Date: Aug. 30, 2018

(87) PCT Pub. No.: WO2017/147655
PCT Pub. Date: Sep. 8, 2017

(65) Prior Publication Data
US 2019/0002720 A1    Jan. 3, 2019

(30) Foreign Application Priority Data

Mar. 1, 2016    (AU) ................... 2016900761

(51) Int. Cl.
*C09D 11/50*    (2014.01)
*G01J 1/50*    (2006.01)
(Continued)

(52) U.S. Cl.
CPC .............. *C09D 11/50* (2013.01); *B82Y 30/00* (2013.01); *C09D 4/00* (2013.01); *C09D 5/29* (2013.01);
(Continued)

(58) Field of Classification Search
CPC ....... C09D 11/50; C09D 11/00; C09D 11/106; C09D 11/322; C09D 11/328; C09D 4/00;
(Continued)

(56) References Cited

U.S. PATENT DOCUMENTS 5,075,557 A * 12/1991 Harasawa ................. G01J 1/50
250/372
6,060,321 A * 5/2000 Hovorka ................ G01N 31/22
422/421

(Continued)

FOREIGN PATENT DOCUMENTS

WO    WO-2008/144541 A1    11/2008
WO    WO-2010/010321 A1    1/2010

OTHER PUBLICATIONS

Pondelak et al., "Dependence of Binder and Photocatalyst in Photocatalytically Active Printing Ink", Jun. 2013, XIth Symposium on Graphic Arts, Pardubice, Czech Republic, pp. 53-58 (Year: 2013).*

(Continued)

*Primary Examiner* — David P Porta
*Assistant Examiner* — Jeremy S Valentiner

(57) ABSTRACT

The invention relates to a photosensitive printing composition comprising a photocatalyst which exhibits a photocatalytic effect when exposed to UV and/or visible radiation, a colouring agent that exhibits a colour change in response to the photocatalytic effect, and a film forming agent. The composition has a viscosity suitable for printing. The invention further relates to a sun-exposure sensor comprising a photosensitive layer printed on a surface of a support, the photosensitive layer comprising a photocatalyst which exhibits a photocatalytic effect when exposed to UV and/or (Continued)

visible radiation, a colouring agent that exhibits a colour change in response to the photocatalytic effect, and a film forming agent.

16 Claims, 13 Drawing Sheets

(51) Int. Cl.
| | |
|---|---|
| C09D 11/106 | (2014.01) |
| C09D 11/328 | (2014.01) |
| B82Y 30/00 | (2011.01) |
| G01N 3/22 | (2006.01) |
| C09D 5/29 | (2006.01) |
| C09D 4/00 | (2006.01) |
| C09D 11/322 | (2014.01) |
| C09D 11/00 | (2014.01) |

(52) U.S. Cl.
CPC ............ *C09D 11/00* (2013.01); *C09D 11/106* (2013.01); *C09D 11/322* (2013.01); *C09D 11/328* (2013.01); *G01J 1/50* (2013.01); *G01N 3/22* (2013.01)

(58) Field of Classification Search
CPC .. C09D 5/29; B82Y 30/00; G01J 1/50; G01N 3/22
See application file for complete search history.

(56) References Cited

U.S. PATENT DOCUMENTS

| | | | | |
|---|---|---|---|---|
| 6,770,687 | B1* | 8/2004 | Tan | B41M 3/148 |
| | | | | 106/31.14 |
| 2003/0045608 | A1* | 3/2003 | Ochiai | G01N 31/223 |
| | | | | 523/160 |
| 2007/0122185 | A1 | 5/2007 | Yamazaki et al. | |
| 2010/0261263 | A1* | 10/2010 | Vo-Dinh | A61L 2/08 |
| | | | | 435/287.1 |
| 2010/0302300 | A1* | 12/2010 | Verdonck | B41J 2/2107 |
| | | | | 347/17 |
| 2012/0111409 | A1* | 5/2012 | Kim | C09D 11/52 |
| | | | | 136/263 |
| 2012/0137958 | A1* | 6/2012 | Mills | G03F 7/004 |
| | | | | 116/201 |
| 2012/0142527 | A1* | 6/2012 | Smyth | G01N 31/225 |
| | | | | 503/201 |
| 2012/0205591 | A1 | 8/2012 | Patel | |
| 2012/0308787 | A1* | 12/2012 | Kozee | B41J 3/407 |
| | | | | 428/195.1 |
| 2017/0247555 | A1* | 8/2017 | Franses | B41J 2/01 |

OTHER PUBLICATIONS

Lawrie et al., "Simple inkjet-printed, UV-activated oxygen indicator", Jan. 2013, Sensors and Actuators B: Chemical, vol. 176, pp. 1154-1159 (Year: 2013).*

Mills et al.: "Development of a novel UV indicator and dosimeter film", The Analyst, Royal Society of Chemistry, UK, No. 130, (2005), pp. 1046-1051.

Pondelak et al.: "Dependence of Binder and Photocatalyst in Photocatalytically Active Printing Ink", Xith Symposium on Graphic Arts (2013), Scientific Papers of the University of Pardubice, (2013), pp. 53-58.

European Search Report and Written Opinion dated Feb. 14, 2019 by the European Patent Office for EP Application No. 17759010.6, filed on Mar. 1, 2017 and published as EP 3423798 on Jan. 9, 2019 (Applicant—NewSouth Innovations Pty Limited)(8 Pages).

Mills, A. et al., Development of a Novel UV Indicator and Dosimeter Film. Analyst. 2005; 130:1046-51.

Mills, A. et al., UV Dosimeter Based on Dichloroindophenol and Tin(IV) Oxide. Analyst. 2009; 134:845-50.

Pondelak, A. et al., Dependence of Binder and Photocatalyst in Photocatalytically Active Printing Ink. IXth Symposium on Graphic Arts (2013), Scientific Papers of the University of Pardubice, Series A. pp. 53-58.

International Search Report and Written Opinion dated May 22, 2017 by the International Searching Authority for Patent Application No. PCT/AU2017/050181, which was filed on Mar. 1, 2017 and published as WO 2017/147655 on Sep. 8, 2017 (Inventor—Gooding et al.; Applicant—Newsouth Innovations PTY, Ltd.) (9 pages).

International Preliminary Report on Patentability dated Sep. 4, 2018 by the International Searching Authority for Patent Application No. PCT/AU2017/050181, which was filed on Mar. 1, 2017 and published as WO 2017/147655 on Sep. 8, 2017 (Inventor—Gooding et al.; Applicant—Newsouth Innovations PTY, Ltd.) (6 pages).

"Examination Report Report corresponding to European Application No. 17759010.6 dated Nov. 19, 2020".

* cited by examiner

PHOTOSENSITIVE PRINTING COMPOSITION

This application is a U.S. National Phase Application of International Application No. PCT/AU2017/050181, filed Mar. 1, 2017, which claims priority to AU 2016900761, filed Mar. 1, 2016, both of which applications are hereby incorporated by reference in their entireties.

TECHNICAL FIELD

The present invention relates to photosensitive printing compositions. The photosensitive printing composition of the invention can be used in the preparation of sensors which are capable of detecting levels of exposure to ultraviolet (UV) radiation.

BACKGROUND

Sunburn is the main cause of skin cancer. Sun exposure that does not result in burning can still cause damage to skin cells and increase the long term risk of developing skin cancer. According to the radiation protection standard by Australian Radiation Protection and Nuclear Safety Agency (ARPNS), the exposure threshold leading to sunburn for human exposure to incident UV radiation (UVR) upon the skin or eyes is 30 joule per square meter in an 8 hour working day [Australian Radiation Protection And Nuclear Safety Agency (ARPNS), R.P.S., *Radiation Protection Standard*. 2003]. During summer in Melbourne, Australia, the time to reach this threshold may be about 7 minutes for fair skin. The duration that is required to exceed the exposure limit varies with the intensity of solar UVR and skin type of the person who is being exposed to solar UV. Therefore, it is challenging to judge the appropriate amount of time that is safe under UV sun exposure.

In humans, Vitamin D is synthesised in the skin and exposure of the skin to UV radiation is required for the synthesis of Vitamin D. Accordingly, too little exposure to solar UV can have detrimental health effects due the resultant low level of vitamin D.

Currently, most UV sensor technologies involve integration of the sensing material into other devices (such as smart phones) or other high-technology wearable sensors. A disposable sunburn sensor for one-off usage has been produced as Sun Signal®, which employs methyl orange as a pH indicating dye and an organic halogen, such as 1,2-dibromotetrachloroethane, as the UV-driven acid-release agent [Stuart Jackson, J.M., Radiation indicator device, I.A.P.U.T-.P.C.T. (PCT), Editor. 2001]. The Sun Signal® device is fabricated via the deposition of several sequential layers and contains halogenated organic materials that produce acidic compounds after exposure to UV. These acidic compounds are responsible for the change in the colour of the device, which is incorporated onto an adhesive strip so it can be applied to the skin. Mills et al. improved upon this disposable UV-dosimeter technology by introducing a base to delay the change in the colour. In this way the sensor performance can be tuned to change colour after different UV exposure times and to match different skin types [Mills, A., et al., Chemical Communications, 2009(11): p. 1345-1346]. Furthermore, UV dosimeters based on benzyl viologen and polyvinyl alcohol, dichloroindophenol and $SnO_2$ and neotetrazolium chloride have also been reported.

It would be advantageous to provide an alternative disposable sun-exposure sensor for one-off usage. It would also be advantageous to provide such a disposable sensor which can be prepared from benign materials and which can be fabricated with readily available and inexpensive processes. Furthermore, it would advantageous to provide such a disposable sensor which can be calibrated to match different skin types.

SUMMARY OF THE INVENTION

In a first aspect, the present invention provides a photosensitive printing composition comprising:
(i) a photocatalyst which exhibits a photocatalytic effect when exposed to UV and/or visible radiation;
(ii) a colouring agent that exhibits a colour change in response to the photocatalytic effect; and
(iii) a film forming agent;
wherein the composition has a viscosity suitable for printing.

In some embodiments, the photosensitive printing composition has a viscosity in the range of about 0.001 to about 0.01 Pa·s at 25° C. In some embodiments, the composition has a viscosity of about 0.001 to 0.005 Pa·s at 25° C.

In some embodiments, the photocatalyst is a metal oxide nanoparticle.

In some embodiments, the photocatalyst is a $TiO_2$ nanoparticle. In some embodiments, the composition comprises $TiO_2$ nanoparticles in a concentration of from 0.1 mg/ml to 30 mg/ml. In some embodiments, the composition comprises $TiO_2$ nanoparticles in a concentration of from 15 mg/ml to 20 mg/ml. In some embodiments, the $TiO_2$ nanoparticles have a particle size in the range of about 10 to 50 nm, e.g. in the range of about 20 to 30 nm.

In some embodiments, the colouring agent is a food dye, e.g. fast green FCF or brilliant blue FCF.

In some embodiments, the film forming agent is a polymer selected from the group consisting of xanthan gum, poly (N-isopropylacrylamide), polyethylene glycol (PEG), polyvinyl alcohol (PVA), polyvinylpyrrolidone (PVP), polyacrylic acid, polymethacrylic acid, poly(hydroxyethyl methacrylate) (PHEMA), polyacrylamide, polyethylene glycol, polypropylene glycol, or any combination thereof.

In some embodiments, the photosensitive printing composition is for inkjet printing, screen printing, spray printing, flexography printing or contact printing.

In a second aspect, the present invention provides a sun-exposure sensor comprising a printed photosensitive layer on a surface of a support, the photosensitive layer comprising:
(i) a photocatalyst which exhibits a photocatalytic effect when exposed to UV and/or visible radiation;
(ii) a colouring agent that exhibits a colour change in response to the photocatalytic effect; and
(iii) a film forming agent.

The photosensitive layer may be printed on the surface of the support using the photosensitive printing composition according to the first aspect of the present invention.

In some embodiments, the photosensitive layer has a thickness of less than 100 µm, e.g. from about 1 µm to 50 µm or from about 5 µm to 20 µm.

In some embodiments, the support is in the form of a sheet comprised of a material selected from the group consisting of plastic, paper, cloth, composite materials, metallic films and cellophane. In some embodiments, the support is paper and the photosensitive layer is on the upper surface of the paper and the paper has an adhesive layer on the lower surface.

In some embodiments, the sun-exposure sensor further comprises a filter layer disposed on the photosensitive layer. In some embodiments, the filter layer is a neutral density (ND) filter layer.

BRIEF DESCRIPTION OF THE FIGURES

The invention will be further described, by way of example only, with reference to the accompanying drawings, in which.

DESCRIPTION OF THE INVENTION

Figure 1:
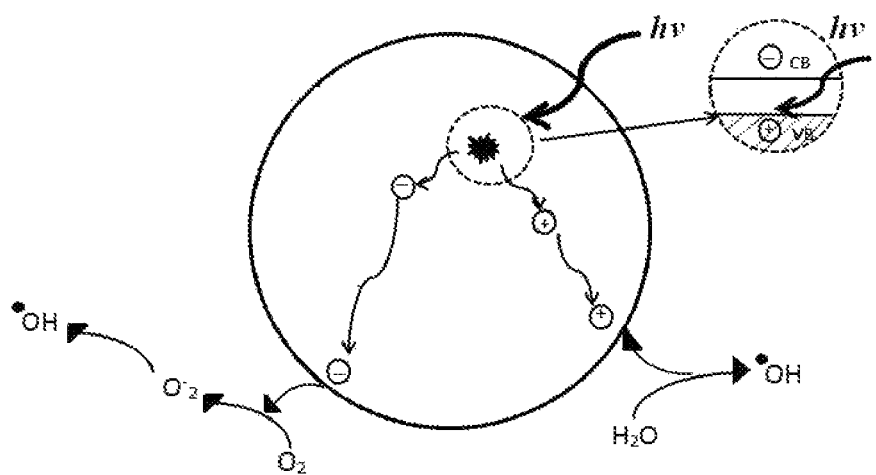
FIG. 1 is a schematic depicting photo-excitation on the surface of a titanium dioxide particle.

Printing is a process for applying text or images to the surface of a substrate in a repeatable manner. Printing processes allow the mass production of printed materials. Modern large-scale printing is typically done using a printing press, while small-scale printing is typically carried out free-form with a digital printer. Though paper is the most common substrate, printing may also be performed on the surface of other substrates, for example those made of metals, plastics, cloth and composite materials. On paper it is often carried out as a large-scale industrial process and is an essential part of publishing and transaction printing.

As used herein, the term "printing composition" refers to a composition suitable for use in a printing process to form a printed image (e.g. text or a picture) on a surface. The printing composition adheres to the surface leaving a printed image on the surface.

A photosensitive printing composition is a printing composition which exhibits a reaction to light. The photosensitive printing composition of the present invention typically exhibits an irreversible colourimetric reaction to light having a wavelength in the range of about 280 to 800 nm.

A photocatalyst is a catalyst which accelerates a chemical reaction when the catalyst is exposed to light. The light may be visible or ultraviolet light. As used herein, the term "nanoparticles" refer to particles between 1 and 100 nm in size. Photocatalytic nanoparticles are photocatalysts in the form of nanoparticles.

According to a first aspect, the present invention provides a photosensitive printing composition. The photosensitive printing composition comprises a photocatalyst which exhibits a photocatalytic effect when exposed to UV and/or visible radiation. The photosensitive printing composition further comprises a colouring agent that exhibits a colour change in response to the photocatalytic effect and a film forming agent.

The photocatalyst, the colouring agent, and the film forming agent are dispersed in the photosensitive printing composition. As used herein, the term "dispersed in" means distributed in, i.e. the colouring agent, the photocatalyst and the film forming agent are distributed in the composition. Typically, the photocatalyst, the colouring agent and the film forming agent are distributed evenly in the composition.

Typically, the composition further comprises a liquid carrier or solvent.

The colouring agent exhibits a colour change in response to the photocatalytic effect of the photocatalyst. Typically, the degree of colour change depends on the amount of UV and/or visible radiation to which the composition, or a printed image formed from the composition, is exposed.

Without wishing to be bound by theory, the inventors believe that on exposure of the printing composition of the present invention, or a printed image formed from the printing composition of the present invention, to UV and/or visible radiation, the photocatalyst generates a reactive species which interacts with the colouring agent causing the colouring agent to degrade (photo-degradation) or decompose (photodecomposition). As a result of this photo-degradation or photodecomposition, the colouring agent exhibits a colour change. The colour change is irreversible.

Photocatalyst

A photocatalyst is a catalyst that accelerates a chemical reaction when the catalyst is exposed to light.

The photocatalyst used in the present invention exhibits a photocatalytic effect when exposed to UV and/or visible radiation, that is radiation having a wavelength in the range of about 280 nm to 800 nm. Typically, the photocatalyst exhibits a photocatalytic effect when exposed to UV radiation (i.e. radiation having a wavelength in the range of 280 to 400 nm). As a person skilled in the art will appreciate, UV radiation and visible light are both forms of electromagnetic radiation. As used herein, the term "light" encompasses visible light as well as UV radiation.

The photocatalyst may, for example, be a photocatalytic metal nanoparticle, such as, for example silver nanoparticles.

In some embodiments, the photocatalytic metal nanoparticles have a particle size (i.e. a maximum dimension) in the range of about 10 to 50 nm, e.g. 20 to 30 nm.

The photocatalyst may, for example, be a photocatalytic metal oxide nanoparticle. For example, the photocatalytic metal oxide nanoparticle may be selected from the group consisting of titanium dioxide nanoparticles, zinc oxide nanoparticles, tungsten oxide nanoparticles, tin oxide nanoparticles and cobalt oxide nanoparticles.

In some embodiments, the photocatalytic metal oxide nanoparticles have a particle size (i.e. a maximum dimension) in the range of about 10 to 50 nm, e.g. 20 to 30 nm.

The photocatalyst exhibits a photocatalytic effect when exposed to UV and/or visible radiation. As used herein, the term "photocatalytic effect" refers to an effect, produced by the photocatalyst when exposed to UV and/or visible radiation, which is capable of inducing a chemical reaction. The photocatalytic effect typically comprises the formation of free radicals (e.g. hydroxyl radicals) which are capable of reacting with the colouring agent to cause a colour change to the colouring agent.

In one embodiment, the photocatalyst is a titanium dioxide nanoparticle. Titanium dioxide ($TiO_2$) nanoparticles are nontoxic, relatively inexpensive and highly photostable photocatalysts that are already used in sunscreens for blocking UV radiation. This wide band gap semiconductor is inherently UV-selective. Two different crystal structures of $TiO_2$, rutile and anatase, are commonly used in photocatalysis with anatase showing a higher photocatalytic activity. In particular, it has been found that mixed-phase $TiO_2$ photocatalysts, for example, the commercially available Aeroxide P25 powder (comprising about 25% rutile and 75% anatase), had higher photocatalytic activities than those in single anatase or rutile phase.

The photocatalytic effect of titanium dioxide ($TiO_2$) nanoparticles has been documented. For example, photocatalytic oxidation of organic compounds by titanium dioxide ($TiO_2$) nanoparticles has been reported in the literature. In the case of photocatalytic reactions in aqueous system, two photocatalytic mechanisms have been proposed for $TiO_2$. One suggests that when UV radiation illuminates $TiO_2$, electron and hole pairs are created. If these electron and holes can avoid recombination and migrate to the surface of the $TiO_2$, they can participate in surface reactions with oxygen and water and produce oxygen ion and hydroxyl radicals, respectively (see FIG. 1). The other mechanism suggests that the organic compound has to be firstly adsorbed on the catalyst surface and then reacts with excited superficial hole-electron pairs or OH radicals from adsorbed water to form the final products.

The printing composition may, for example, comprise the photocatalyst in an amount of 0.1 mg/ml to 30 mg/ml, e.g. between 1 mg/ml and 30 mg/ml, e.g. between 5 mg/ml to 30 mg/ml.

When the photocatalyst is a photocatalytic nanoparticle, such as $TiO_2$ nanoparticles, and the composition is intended for inkjet printing, the concentration of the photocatalyst in the printing composition is typically less than 30 mg/ml, e.g. 0.1 mg/ml to 30 mg/ml, 1 to 30 mg/ml, 3 to 30 mg/ml, 1 to 20 mg/ml, 1 to 10 mg/ml or 5 mg/ml to 10 mg/ml. Concentrations of $TiO_2$ nanoparticles higher than about 30 mg/ml can result in clogging of the nozzle of the inkjet printer.

The photocatalyst and colouring agent are selected such that exposure of the photocatalyst to UV and/or visible radiation results in a colour change to the colouring agent.

Colouring Agent

The colouring agent may be any agent that exhibits a colour change in response to the photocatalytic effect of the photocatalyst. The colouring agent is typically a coloured substance. However, in some embodiments, the colouring agent is initially colourless and becomes coloured in response to the catalytic effect. The colouring agent is typically an organic compound, e.g. an organic dye. A dye is a coloured substance that has an affinity to one or more substrates.

The colour change may be an increase or decrease in colour, or a change in colour. The colour change may be the loss of colour, such that an image formed from the photosensitive printing composition of the present invention fades when the image, and thus the photocatalyst in the image, is exposed to UV and/or visible radiation. In other embodiments, the colour change is an increase in colour or a change of colour.

Suitable colouring agents include:
a) Triarylmethane dyes such as methyl violet dyes, fuchsine dyes, phenol dyes, malachite green dyes (including malachite green (4-{[4-(dimethylamino)phenyl](phenyl)methylidene}-N,N-dimethylcyclohexa-2,5-dien-1-iminium chloride), Brilliant Blue FCF (ethyl-[4-[[4-[ethyl-[(3-sulfophenyl) methyl] amino] phenyl]-

(2-sulfophenyl) methylidene]-1-cyclohexa-2,5-dienylidene]-[(3-sulfophenyl) methyl] azanium) and Fast Green FCF (ethyl-[4-[[4-[ethyl-[(3-sulfophenyl) methyl] amino] phenyl]-(4-hydroxy-2-sulfophenyl) methylidene]-1-cyclohexa-2,5-dienylidene]-[(3-sulfophenyl) methyl] azanium)), and Victoria blue dyes;
b) Azo dyes, including food grade azo dyes such as Allura Red AC, Tartrazine, and Sunset Yellow, and other azo-dyes such as Alizarine, Methyl Orange, Bismark brown, Ponceau Red, Sudan Red and Sudan dyes;
c) Fluorone dyes such as Erythrosine, Rhodamine and Fluorescein dyes.

In one embodiment of the present invention, the colouring agent is a food dye.

An advantage of using a commercially available food dye is that these compounds have been previously approved by the regulatory authorities, such as the Food and Drug Authority (FDA) in the United States, for human consumption. It is expected that such approved food dyes would not need to undergo further approval prior to their implementation into the printing compositions of the present invention. Furthermore, it is not expected that these food dyes would produce any chemical compounds during their photodegradation or photodecomposition which would be harmful to the skin of a person wearing a product, such as a sun-exposure sensor, comprising matter printed using the printing composition. Furthermore, such food dyes are readily available.

It is therefore possible to select a colouring agent for use in the printing composition of the present invention which is readily available, does not require further approval for the proposed use and is unharmful for use, and one which exhibits a colour change in response to the photocatalytic effect of a given photocatalyst.

For example, when $TiO_2$ nanoparticles are employed as the photocatalyst of the printing composition of the present invention, preferred food dyes include, for example, malachite green, fast green FCF and brilliant blue FCF.

Typically, the colouring agent is soluble in the carrier or solvent.

The concentration of the colouring agent in the composition may, for example, be 0.001 to 10 mg/ml, e.g. 0.01 to 10 mg/ml, 0.1 to 10 mg/ml, 1 to 10 mg/ml or 1 to 4 mg/ml.

As a person skilled in the art will appreciate, a colouring agent which is not a food dye, may also be used. Examples of other colouring agents include methylene blue, methyl orange, azo dye, xanthene dye, fluorene dye and rhodamine dye.

Film Forming Agent

The film forming agent (or film former) may be any compound that facilitates the printing composition to form a film when the printing composition is applied to a surface. Typically, the printing composition forms a cohesive and continuous film on the surface.

The film forming agent enables the printing composition to form a layer comprising the photocatalyst and the colouring agent on a surface. Furthermore, the film forming agent maintains the integrity of the layer after printing.

The film forming agent may be a conventional film forming agent used in prior art inks, paints, varnishes or cosmetics.

The film forming agent for use in the printing composition of the present invention is selected such that it is compatible with the photocatalyst, e.g. the photocatalytic metal oxide nanoparticles, and the colouring agent. Furthermore, the film forming agent preferably exhibits a relatively low viscosity, which is sufficiently low at high shear rates when combined in the remaining components of the printing composition, for use in printing.

The film forming agent may be a polymer (i.e. a polymeric film forming agent). As a person skilled in the art will appreciate, the film forming agent will be selected taking into account the nature of the solvent or carrier included in the printing composition, as well as the other components of the printing composition. The film forming agent is preferably soluble in the carrier or solvent. When the carrier is an aqueous solution, the polymer may, for example, be xanthan gum, poly (N-isopropylacrylamide), polyethylene glycol (PEG), polyvinyl alcohol (PVA), polyvinylpyrrolidone (PVP), polyacrylic acid, polymethacrylic acid, poly(hydroxyethyl methacrylate), polyacrylamide, polyethylene glycol, polypropylene glycol, or any combination thereof. Where the carrier is not an aqueous solution, other polymers may be used, for example, polyvinyl acetate (PVAc).

In one embodiment the film-forming agent is PVP. PVP is generally safe and has been previously used as a binder in many pharmaceutical tablets because it simply passes through the body when taken orally. Furthermore PVP binds to polar molecules exceptionally well, owing to its polarity. This has led to its application in coatings for photo-quality inkjet papers and transparencies, as well as in inks for inkjet printers.

The printing composition may, for example, comprise the film forming agent in an amount of 1 to 300 mg/ml, e.g. 10 to 300 mg/ml, 1 to 100 mg/ml or 100 to 300 mg/ml.

Carrier

The printing composition of the present invention typically further comprises a liquid carrier or a solvent.

The carrier or solvent may be selected having regard to the photocatalyst, colouring agent and film forming agent included in the composition. The colouring agent and film forming agent are typically dissolved in the carrier or solvent.

The carrier may, for example, be an aqueous solution (e.g. water) or an organic solvent, such as, for example, methanol, ethanol, propanol, butanol, methyl ethyl ketone, isopropyl alcohol or acetonitrile. Other polar solvents may be used.

Advantageously, the carrier may be an aqueous solution. Water is a preferred carrier or solvent as water is non-toxic, inexpensive and easy to handle.

The printing composition may comprise further ingredients, in addition to the photocatalyst, colouring agent, film forming agent and carrier or solvent, provided that the printing composition has a viscosity suitable for printing.

Printing Composition

By selecting suitable photocatalysts, colouring agents, film forming agents and carriers or solvents, the photosensitive printing composition of the present invention can advantageously be prepared having properties suitable for printing using conventional printing machines. This enables the simple printing of the composition onto a surface.

Inkjet printing is a type of printing that recreates a digital image by propelling droplets of ink onto paper, plastic, or other substrates. Inkjet printers are the most commonly used type of printer, and range from small inexpensive consumer models to expensive professional machines. There are two main technologies in use in contemporary inkjet printers, namely continuous inkjet (CIJ) and drop-on-demand (DOD). It is envisaged that the printing composition of the present invention will be compatible with both of the technologies used for contemporary inkjet printers.

CIJ printers are a non-contact form of high-speed printing that operates by channelling a continuous stream of ink through a nozzle. The stream of ink is then broken up into individual droplets at a rate of 120,000 per second, selectively charged, and then deflected into a dot matrix pattern to form an image on a surface. Undeflected drops are recirculated.

Drop-on-demand (DOD) is divided into thermal DOD and piezoelectric DOD. Most consumer inkjet printers, including those from Canon, Hewlett-Packard, and Lexmark, use the thermal inkjet process. In the thermal inkjet process, the print cartridges consist of a series of tiny chambers, each containing a heater. To eject a droplet from each chamber, a pulse of current is passed through the heating element causing a rapid vaporization of the ink in the chamber and forming a bubble, which causes a large pressure increase, propelling a droplet of ink onto the paper. The ink's surface tension, as well as the condensation and resultant contraction of the vapour bubble, pulls a further charge of ink into the chamber through a narrow channel attached to an ink reservoir. The inks involved are usually water-based and use either pigments or dyes as the colorant. The inks must have a volatile component to form the vapour bubble; otherwise droplet ejection cannot occur. As no special materials are required, the print head is generally cheaper to produce than in other inkjet technologies.

In piezoelectric DOD, an electric pulse is passed through piezoelectric crystals or ceramic chambers. The run voltage causes a change in the shape of the ink chambers (i.e. the piezoelectric material changes shape), whereby the ink is forced through the nozzles. The resulting vacuum in the chamber draws more ink from the ink tank to fill it up again. Piezoelectric inkjets allow a wider variety of inks than thermal inkjets as there is no requirement for a volatile component, and no issue with build-up of ink residue, but the print heads are more expensive to manufacture due to the use of piezoelectric material (usually PZT, lead zirconium titanate).

Desktop inkjet printers, as used in offices or at home, tend to use aqueous inks as printing compositions, which are based on a mixture of water, glycol and dyes or pigments. These inks are usually inexpensive to manufacture. Aqueous inks are mainly used in printers with thermal inkjet heads.

The viscosity of the printing composition is an important factor in printing processes. Indeed, the viscosity of a printing composition to a large extent determines the quality of the print. If the viscosity of the printing composition is too high, it is difficult to achieve uniformity of an image. Conversely, if the viscosity is too low, fine details may not be possible.

For example, in inkjet printing, if the viscosity of the printing composition is too high, problems will be encountered during the printing process. For example, clogging of the nozzle may occur, potentially destroying its ability to print, meaning the nozzle will have to be replaced. Even if the nozzle does not become clogged, using printing compositions which are too viscous will result in non-uniform printing i.e. printed images or layers which are non-uniform in thickness. In general, the viscosity of a printing composition determines its ability to be printed in a uniform manner.

The shear rate for printing is between $10^4$ to $10^5$ s$^{-1}$. For inkjet printing, it is important that the printing composition has a low viscosity at high shear rates.

The printing composition of the present invention preferably has a viscosity in the range of about 0.001 to about 0.01 Pa·s at 25° C. Such a viscosity is suitable for printing using inkjet printers.

As a person skilled in the art will appreciate, the viscosity of the printing composition will depend, among other things, upon the concentration of the various components, as well as the viscosity of each liquid component in the composition.

In some embodiments, the printing composition has a viscosity of about 0.001 to about 0.01 Pa·s at 25° C., e.g. about 0.001 to about 0.005 Pa·s at 25° C., at shear rates greater than 100 s$^{-1}$.

In some embodiments, the printing composition has a viscosity of about 0.001 to about 0.01 Pa·s at 25° C., e.g. about 0.001 to about 0.005 Pa·s at 25° C., at shear rates of $10^4$ to $10^5$ s$^{-1}$.

The printing composition may be prepared by combining the photocatalyst, colouring agent, film forming agent and any other components of the composition in any order. In some embodiments, when the photocatalyst is a nanoparticle, sonication may be used to disperse the nanoparticles in the composition.

In an embodiment, the present invention provides a printing composition suitable for inkjet printing comprising:
(i) 0.1 mg/ml to 30 mg/ml, e.g. 0.1 mg/ml to 20 mg/ml, of photocatalytic nanoparticles (e.g. $TiO_2$ nanoparticles) having a particle size in the range of about 10 to 50 nm, where the photocatalytic nanoparticles exhibit a photocatalytic effect when exposed to UV radiation;
(ii) 0.001 to 10 mg/ml of a colouring agent that exhibits a colour change in response to the photocatalytic effect;
(iii) 1-300 mg/ml of a film forming agent selected from xanthan gum, poly (N-isopropylacrylamide), polyethylene glycol (PEG), polyvinyl alcohol (PVA), polyvinylpyrrolidone (PVP), polyacrylic acid, polymethacrylic acid, water soluble acrylic polymer poly (hydroxyethyl methacrylate), polyacrylamide, polyethylene glycol, polypropylene glycol, or any combination thereof; and
(iv) an aqueous carrier (e.g. water).

An example of a particularly preferred composition for inkjet printing comprises about 26 mg/ml of titanium dioxide nanoparticles, about 180 mg/ml PVP and about 0.8 mg/ml Brilliant Blue FCF and an aqueous carrier.

Advantageously, the photosensitive printing composition of the present invention can be printed as a thin layer. The fabrication process is repeatable and reliable.

Advantageously, the composition of the present invention can be formulated for printing using conventional printing machines. This provides a convenient and cost-effective process for printing the composition to form a thin photosensitive layer on the surface of the substrate.

Advantageously, the composition of the present invention may be printed in a thin layer having a thickness of less than 100 μm, e.g. 1 μm to 50 μm, e.g. 5 μm to 20 μm.

Sun-Exposure Sensor

The present invention provides a sun-exposure sensor comprising a photosensitive layer printed on a surface of a support. The photosensitive layer comprises (i) a photocatalyst which exhibits a photocatalytic effect when exposed to UV and/or visible radiation; (ii) a colouring agent that exhibits a colour change in response to the photocatalytic effect; and (iii) a film forming agent. The photosensitive layer may be printed on the support using a photosensitive printing composition of the first aspect of the present invention.

In another aspect, the present invention provides a sun-exposure sensor comprising a photosensitive layer printed on a surface of a support using a photosensitive printing composition of the first aspect of the present invention.

Typically, the photosensitive layer has a thickness of less than 100 µm, e.g. less than 50 µm.

The support is typically in the form of a sheet having an upper surface and a lower surface. The support may, for example, be comprised of plastic, paper, cloth, composite materials, metallic films or cellophane.

The sun-exposure sensor of the present invention may be in the form of a patch, label or similar product which can be applied to a product or to the exposed skin of a person.

The sun-exposure sensor of the present invention can be used to determine the amount of sunlight to which it, and thus the person or product to which it has been attached, has been exposed. In operation, the photocatalytic effect of the photocatalyst in the sun-exposure sensor causes the decomposition/degradation of the colouring agent resulting in the colour change, typically decolouration, of the photosensitive layer. That is, as a result of the decomposition/degradation of the colouring agent by the photocatalyst in the presence of light, the photosensitive layer will change colour. By observing the colour change of photosensitive layer, the user can assess the amount of sunlight to which the photosensitive layer has been exposed.

In one embodiment, the sun-exposure sensor comprises a photosensitive layer printed on a surface of a support. The photosensitive layer comprises (i) a photocatalyst which exhibits a photocatalytic effect when exposed to UV radiation; (ii) a colouring agent that exhibits a colour change in response to the photocatalytic effect; and (iii) a film forming agent.

Preferably, the change in colour of the photosensitive layer may be observed by the naked eye.

By selecting suitable photocatalysts, colouring agents and film forming agents, photosensitive layers can advantageously be prepared in which the amount of exposure to solar UV radiation (e.g. due to the length of exposure and/or the intensity of the UV radiation) can be monitored effectively by the amount of colour change to the layer.

The rate of change of colour of the layer can be selected such that it is indicative of the UV index. These factors enable a wearer of the sun-exposure sensor to easily determine their exposure to the harmful radiation from the sun and decide whether to reapply a sunscreen and/or seek shelter.

The amount of decolouration of the photosensitive layer, as well as the rate of decolouration, can also be monitored quantitatively, for example, by using UV-VIS reflectance spectroscopic techniques.

In some embodiments, the sun-exposure sensor of the present invention is in the form of a patch, e.g. a patch with an adhesive backing, or similar product which can be applied or adhered to the exposed skin or an item of clothing (e.g. a hat or shirt) of an individual wearer. Such a sun-exposure sensor can be used to assess the amount of sunlight to which the exposed skin of the wearer has been exposed.

In some embodiments, the sun-exposure sensor is used to determine when the wearer has been exposed to more than a safe level of sunlight so that the wearer knows to apply additional sun protection or avoid further exposure to sunlight.

In other embodiments, the sun-exposure sensor can be used to determine whether the wearer has been exposed to sufficient amount of sunlight, for example, to produce a sufficient amount of vitamin D.

As mentioned previously, different skin types are known to withstand different amounts of sun-exposure. Advantageously, the sun-exposure sensors of the present invention can be calibrated for different skin types and different sensitivities to sun-exposure. The sun-exposure sensors can also be calibrated for indicating different levels of sun-exposure, e.g. for determining that the wearer has received sufficient sunlight for vitamin D production or for assessing whether the wearer has exceeded a safe level of exposure to sunlight.

The sun-exposure sensor can also be prepared in the form of a label or patch for application to products to indicate the amount of sunlight to which the product has been exposed. The sun-exposure sensors may, for example, be applied to UV-sensitive products, such as pharmaceuticals or food products, to provide an indication of when the product has been exposed to excessive sunlight.

The time taken for the photosensitive layer to change colour, e.g. to decolour, may be controlled or adjusted by altering the formulation of the printing composition used to prepare the photosensitive layer e.g. the particular colouring agent and photocatalyst used or the amounts of these components in the printing composition.

The sun-exposure sensor can also be calibrated by applying a filter. This enables photosensitive printing compositions to be prepared and printed in bulk, and the resultant printed photosensitive layer to then be calibrated against a standard or modified to prepare sensors suitable for different skin types or other uses. Accordingly, in some embodiments, the sun-exposure sensor further comprises a filter on the surface of the photosensitive layer to be exposed to sunlight. Preferably, the filter is a neutral density filter. A neutral-density filter, or ND filter, is a filter that reduces the intensity of all wavelengths of light within a range of wavelengths to an approximately equal extent. A UV neutral-density filter is filter that is neutral density at UV wavelengths. A photocatalyst will respond to light or energy above its band-gap. A ND filter can be applied to the surface of the photosensitive layer to reduce the intensity of the incident light reaching the photosensitive layer. This reduction in intensity results in a longer time required to achieve a given change to the colour of the photosensitive layer. Filters which remove part of the wavelength range may not have the same effect, as wavelengths not blocked by the filter may be effective to cause the photocatalyst to exhibit a photocatalytic effect.

For example, using different UV neutral density filters, incident light can be blocked thereby altering the rate of colour change of the photosensitive layer, for example from in the range of 1 to 5 hours. In effect, the UV neutral density filters adjust the response time of the reaction between the photocatalyst and the colouring agent. The change in colour of the photosensitive thin layer can be calibrated to match exposure time of different skin types by using UV neutral density filters with the ability to transmit between 1.5 to 70% of the irradiant UV light to the photosensitive layer.

EXAMPLES

Various embodiments of the present invention are described below with reference to the following, non-limiting, Examples.

Experimental Procedures

1. Materials and Methods $TiO_2$ anatase (nanopowder, ≤25 nm particle size, 99.7% trace metals basis), rutile (99.995% trace metals basis), Aeroxide® P25 (anatase/rutile, 21 nm particle size (TEM), ≥99.5% trace metals basis) and polyvinylpyrrolidone (PVP, average molecular weight 10,000 Da) were purchased from Sigma-Aldrich (Sydney-Australia). All FDA approved food dyes used herein (tartazine, sunset yellow, fast green, brilliant blue FCF) had purity of 87.2% and were purchased from Melbourne Food Ingredient Depot (Melbourne, Australia). The water used in all experiments was MilliQ grade reagent water (18 MΩcm).

1.1 Sun-Exposure Sensor Fabrication with Inkjet Printing

For the fabrication of the sun-exposure sensors with inkjet printing, three different stock solutions were prepared. The first was prepared by adding 800 mg of $TiO_2$ (P25, anatase, rutile) per 10 mL water followed by sonication for 15 min. The second solution was prepared by adding 4 g of PVP per 10 mL of water and the third solution was prepared by adding 45 mg of food dye per 10 mL of water. Different ratios of these three solutions were then used to prepare suspensions for printing where the components were stirred for 1 h prior to use.

Figure 2:
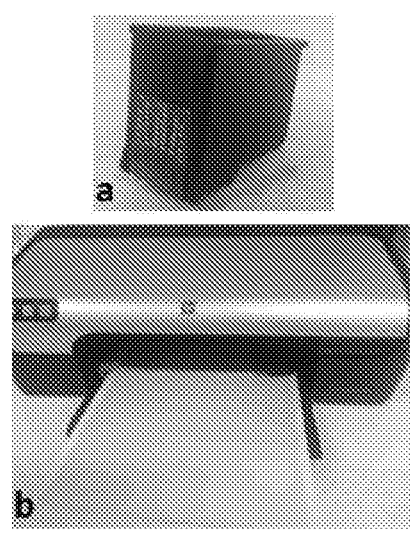
FIG. 2 shows a photograph of the set-up of the equipment used in the Examples having a) empty cartridge and b) inkjet printer.

To load the inkjet printing cartridges for printing, empty and clean ink cartridge C9352AA were filled with the as prepared suspension, and printed using HP Deskjet 2460 inkjet printer on photo paper (Kodak ultra-premium photo paper), see FIG. 2 (a and b).

In some experiments (not described below), the layer obtained from the inkjet printing was laminated by GBC Docuseal 1200, Pouch Laminator. For this purpose 125 micron gloss PKT100 laminating pouches were used. Other laminated pouches may be used, such as those made from polyethylene terephthalate, polyethylene, polyvinyl acetate, or any combination thereof. For example, the harder outer layer may be made from PET plastic (polyethylene perephthalate) and the softer inner layer may be made out of EVA plastic (ethylene-vinyl acetate). It was observed that the lamination with these polymers did not have any significant effect on the decolouration of the layers. The results reported below were obtained without lamination.

1.2 UV Exposure Experiments

Figure 3:
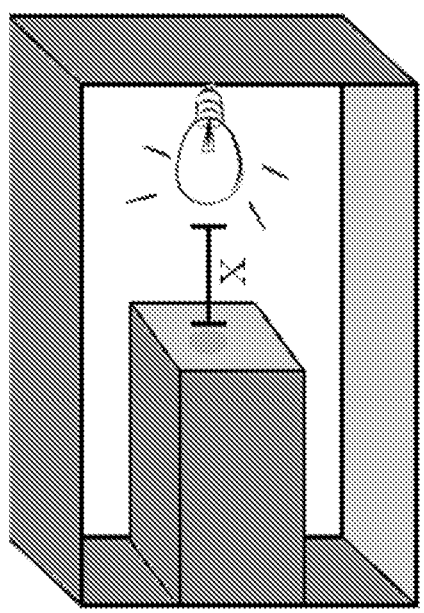
FIG. 3 is a schematic depicting a UV chamber equipped with Osram UV lamp. X, the distance of the sample from the UV lamp, was adjusted so that the intensity of UV on the surface of the layer was 3200 µW/cm$^2$ (measured using UV digital light meter).
Figure 4:
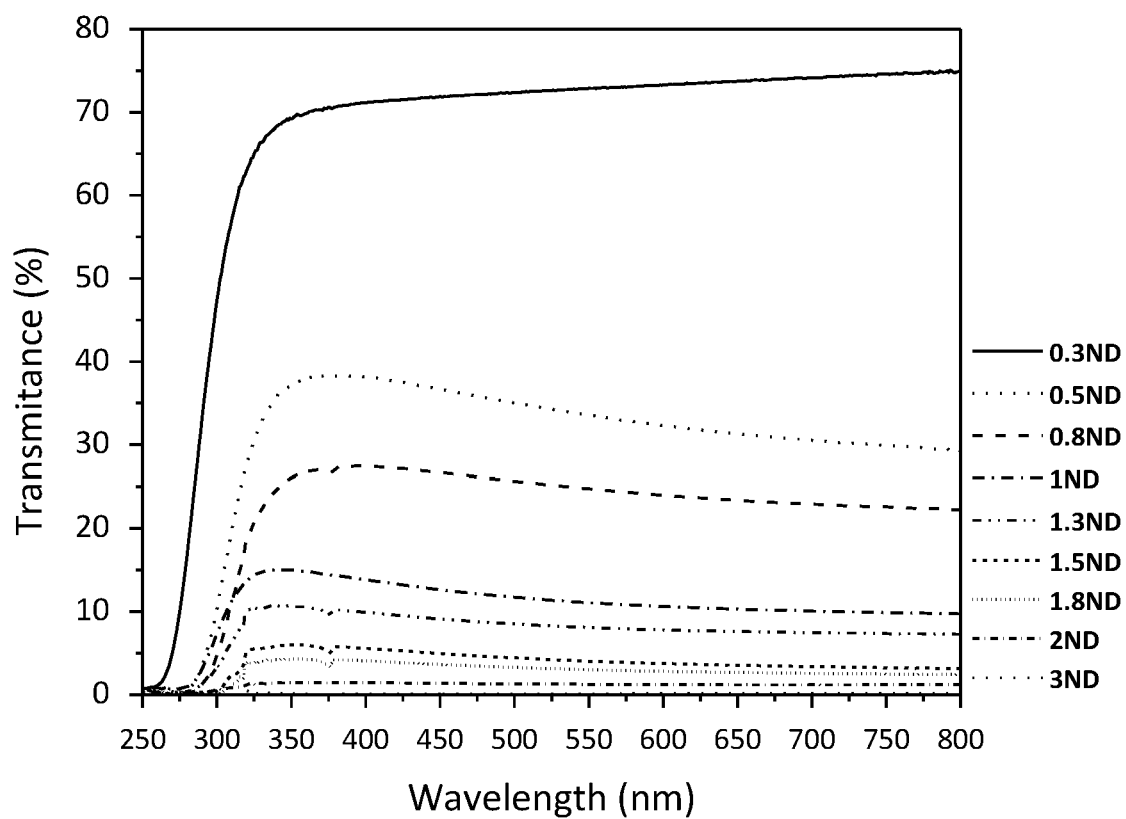
FIG. 4 shows transmittance spectra of ND UV filters used in the Examples.

An Osram ultra-vitalux 300W V AC, lamp (made in SK T1681) was used for the UV exposure experiments and the intensity calibrated to 3200 $\mu W/cm^2$ (refer FIG. 3). The intensity of the UV lamp was calibrated and monitored using UV digital light meter (General Tools & Instruments UV513AB Digital UVC Meter, 280-400 nm). All UV-Vis measurements reported here were performed on solid layers using a LAMBDA 1050 UV/Vis/NIR spectrophotometer equipped with a snap-in 150 mm integrating sphere. Different neutral density UV (ND UV) filters were used to change the intensity of the incident UV that reached the photosensitive layer. In this regard, 0.3, 0.5, 0.8, 1.0, 1.3, 1.5, 1.8 and 2ND UV filters were used which transfer 70%, 35%, 25%, 15%, 10%, 6%, 5% and 1.5% of the incident light with wavelength in the range of 325 to 800 nm, respectively. The respective transmittance spectrum of each of the ND UV filters is shown in FIG. 4.

2. Results and Discussion

Figure 5:
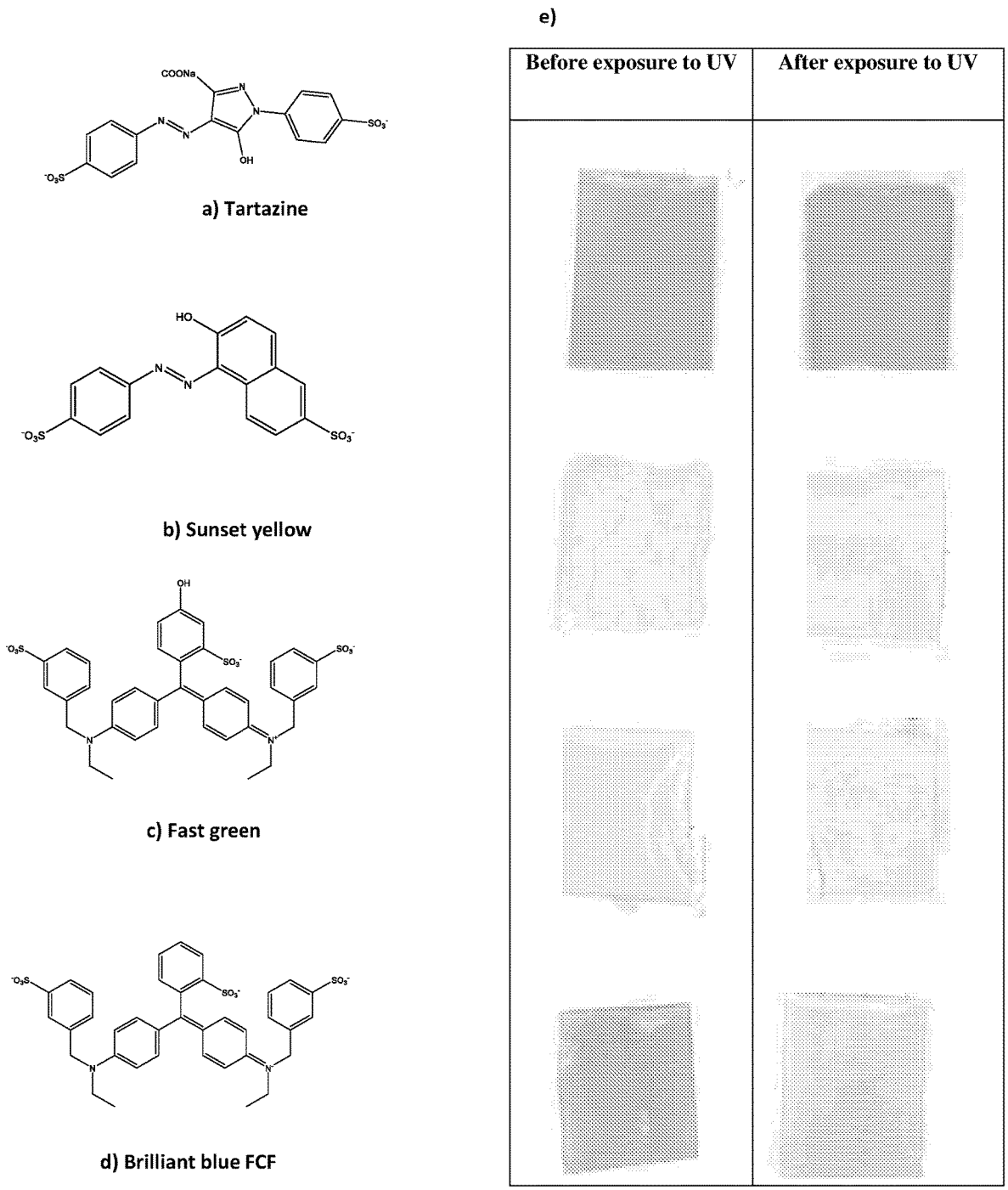
FIG. 5 shows the molecular structure of FDA approved food dyes: a) tartazine, b) sunset yellow, c) fast green FCF and d) brilliant blue FCF and e) photographs of compositions comprising 0.017 mg/ml dye, 33.6 mg/ml TiO$_2$ and 224.08 mg/ml PVP transferred by syringe to the surface of paper, before and after exposure to UV for 1 hour.

The first phase of this work was a comparison of the discolouration of different food dyes in the presence of $TiO_2$. Compositions in the form of slurries were formed with the food dye, PVP and $TiO_2$ and these were spread onto paper. Each composition was comprised of 0.017 mg/ml food dye, 33.6 mg/ml $TiO_2$ and 224 mg/ml PVP in water. Compositions with the FDA approved food dyes tartrazine, sunset yellow, fast green FCF and brilliant blue FCF were prepared, spread on a paper sheet, and were then exposed to the light source for 1 h. The outcomes are shown in FIG. 5 with the corresponding molecular structure of the different FDA approved food dyes. As can be seen in this Figure, photo-degradation of brilliant blue FCF and fast green FCF was clearly detectable by the naked eye (FIG. 5e, bottom two before and after photographs). Considering the fact that a common form of colour blindness creates difficulties for some people in recognizing green, brilliant blue FCF was chosen for use as the colouring agent in the further experiments described below.

Figure 6:
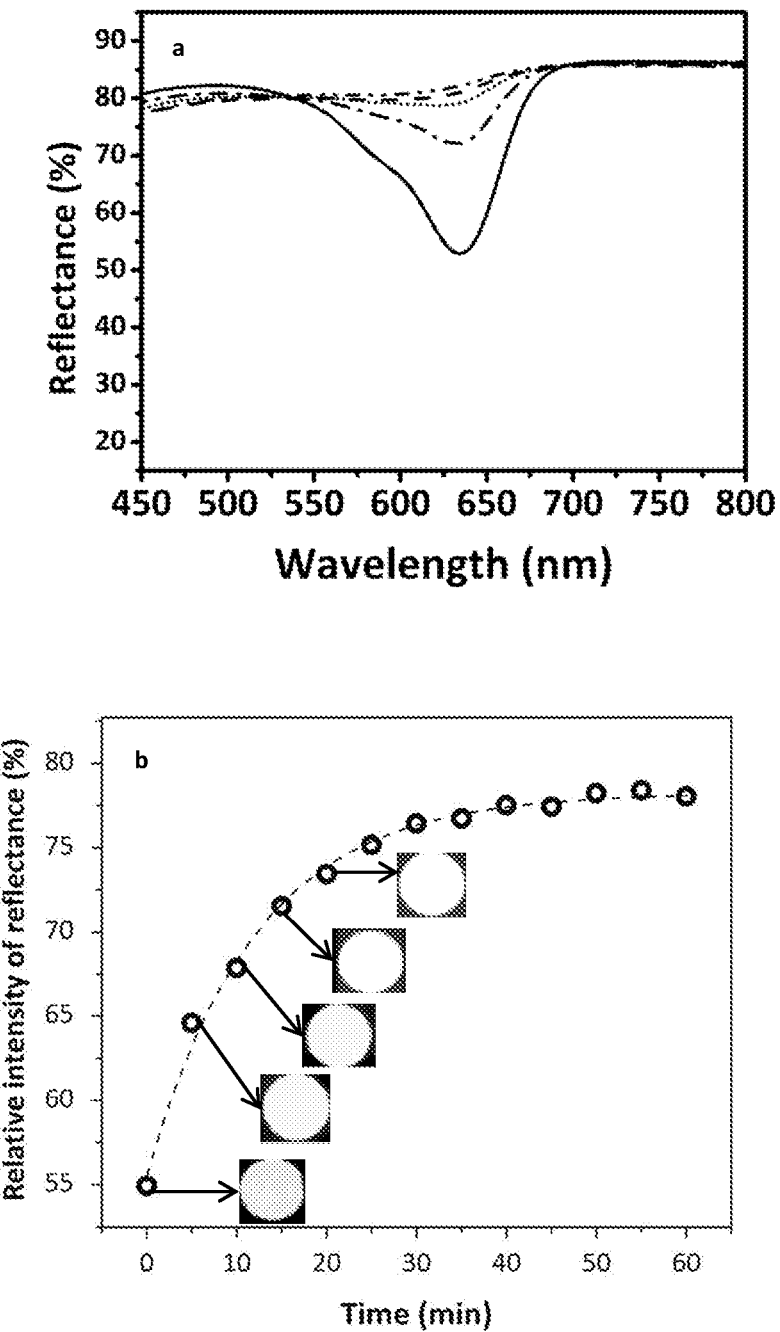
FIG. 6 shows at a) the reflectance in the range of 450-800 nm for a layer obtained from inkjet printing of a composition comprising 2.53 mg/ml brilliant blue FCF, 18.4 mg/ml TiO$_2$ and 123 mg/ml PVP dispersed in water after UV exposure for 60 minutes ( —··—·· ); results are also shown for measurements taken after intervals of ( ——— ) 0 minutes, (—·—·—) 15 minutes, (····) 30 minutes and (— —) 45 minutes of UV exposure; and at b) the change in reflectance intensity of peak at 630 nm versus time of exposure to UV along with first order kinetic fitting for the layer obtained from inkjet printing the composition.
Figure 7:
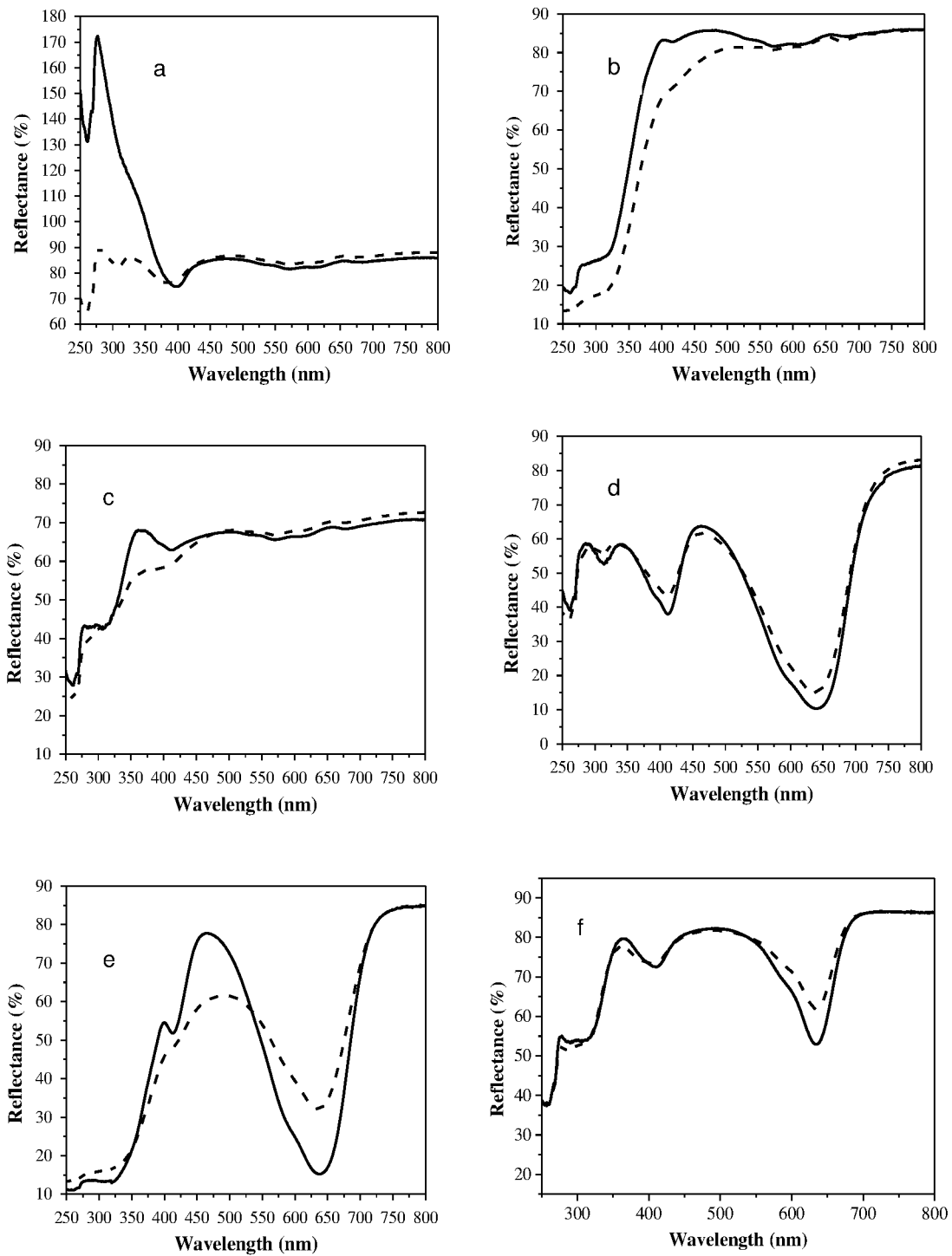
FIG. 7 shows the reflectance spectra of a) paper, b) paper painted with TiO$_2$, c) paper painted with PVP, d) paper painted with brilliant blue FCF, e) paper painted with TiO$_2$ and brilliant blue FCF, f) paper painted with TiO$_2$, brilliant blue FCF and PVP, before ( — ) and after (- - -) exposure to UV for 1 hr.

The process of this decolouration was investigated using reflectance absorbance spectroscopy, see FIG. 6a and FIG. 7. The absorbance spectra over the range of 250-800 nm for a) paper, b) paper painted with $TiO_2$ suspension in water with concentration of 18.4 mg/ml, c) paper painted with the aqueous solution of PVP with concentration of 120 mg/ml, d) paper painted with the aqueous solution of brilliant blue FCF with concentration of 2.53 mg/ml, e) paper painted with the mixture of 18.4 mg/ml $TiO_2$ and 2.53 mg/ml brilliant blue FCF, f) paper painted with the composition comprised of 2.53 mg/ml brilliant blue FCF, 18.46 mg/ml $TiO_2$, 123.07 mg/ml PVP dispersed in 30 ml of water, before (-) and after (- - -) exposure to UV for 1 hr, were measured and are shown in FIG. 7. The suspension or solution was transferred to the paper by syringe. As is evident from FIG. 7d, e and f, a peak due to brilliant blue FCF is observed at 550-670 nm with a peak maximum at 630 nm. It is only the combination of brilliant blue FCF and $TiO_2$ where the peak at 630 nm disappears significantly over time after exposure to UV (FIG. 7e). It was observed that the decline in this peak was more significant with layers obtained from inkjet printing of the combination of brilliant blue FCF, PVP and $TiO_2$. The colour change is more significant due to the inkjet printing giving thinner layers in comparison with layers applied by hand. Note that there are also changes in the range of 250 to 500 nm of reflectance spectra of the layer before and after exposure to UV, but these changes cannot be observed with naked eye. These changes are related to photobleaching of the paper, which is mainly attributed to photochemical cleavage reactions of carbonyl compounds. These carbonyl compounds are part of the lignin structure, the origin of the materials in the paper. Another source of these changes can be mineralization of PVP with $TiO_2$ in presence of UV.

The viscosity of various photosensitive printing compositions of the present invention were then compared with a conventional ink dye used in inkjet printing as well as a composition comprising food dye dispersed in water and a composition comprising food dye and $TiO_2$ nanoparticles dispersed in water. The viscosity was measured using an Anton-PAAR MCR 302 rheometer. The compositions tested were:

"food dye" (4.5 mg/ml brilliant blue FCF in water);

"3Food dye+1.5$TiO_2$" (3 ml of the stock solution of brilliant blue FCF and 1.5 ml of the stock solution of $TiO_2$, resulting in a final composition comprising 3.00 mg/ml brilliant blue FCF and 26.67 mg/ml $TiO_2$ in water);

"3Food dye+1.5$TiO_2$+2PVP" (3 ml of the stock solution of brilliant blue FCF, 1.5 ml of the stock solution of $TiO_2$ and 2 ml of the stock solution of PVP, resulting in a final composition 2.07 mg/ml brilliant blue FCF, 18.46 mg/ml $TiO_2$ and 123.03 mg/ml PVP in water);

"4.5Food dye+1.5$TiO_2$+2PVP" (4.5 ml of the stock solution of brilliant blue FCF, 1.5 ml of the stock solution of $TiO_2$ and 2 ml of the stock solution of PVP, resulting in a final composition comprising 2.53 mg/ml brilliant blue FCF, 15.00 mg/ml $TiO_2$ and 100.00 mg/ml PVP in water);

"3Food dye+1.5$TiO_2$+4PVP" (3 ml of the stock solution of brilliant blue FCF, 1.5 ml of the stock solution of $TiO_2$ and 4 ml of the stock solution of PVP, resulting in a final composition comprising 1.58 mg/ml brilliant blue FCF, 14.11 mg/ml $TiO_2$ and 188.23 PVP mg/ml in water).

Figure 8:
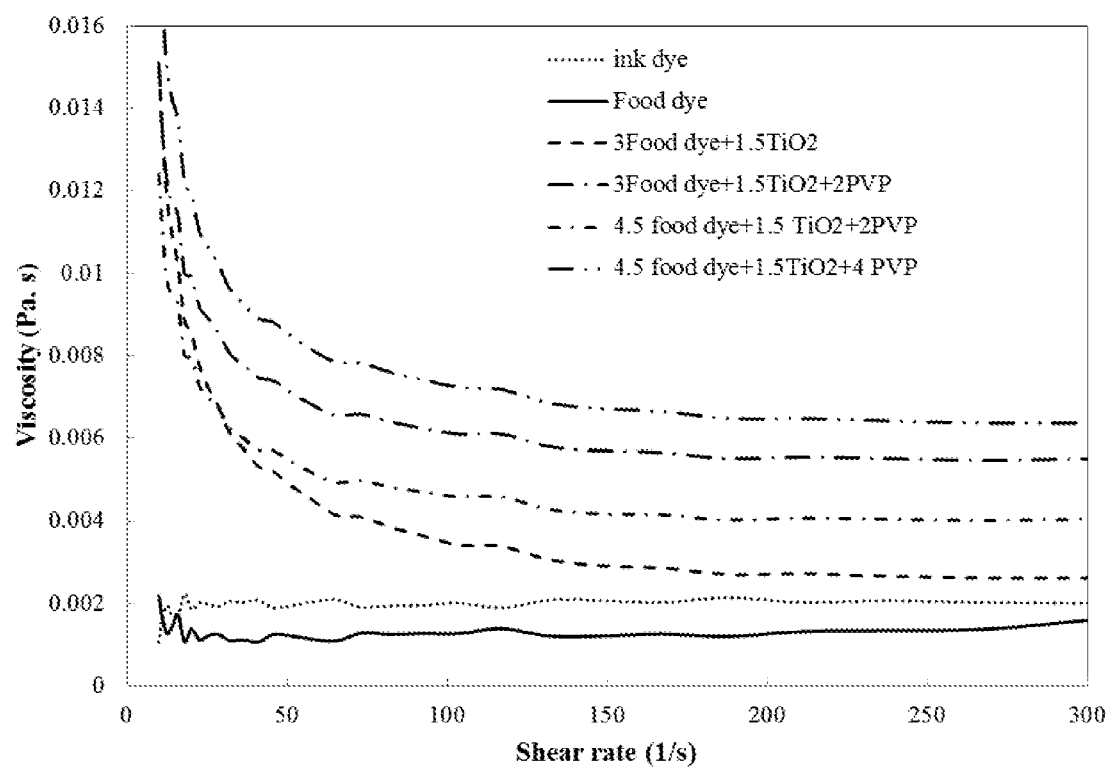
FIG. 8 shows a comparison of the viscosity at different shear rates for a composition comprising food dye (brilliant blue FCF) dispersed in water, a composition comprising food dye and TiO$_2$ nanoparticles dispersed in water, various photosensitive printing compositions of the present invention composed of food dye (brilliant blue FCF), TiO$_2$ nanoparticles and PVP dispersed in water, and a conventional ink dye applied in inkjet printing.

The results are shown in FIG. 8. As shown in FIG. 8, at higher shear rates (e.g. higher than 100 $s^{-1}$), the viscosity of the photosensitive printing compositions of the invention decreases and is close to the viscosity of the conventional ink. Even higher shear rates are used in conventional printing processes. These results demonstrate that the photosensitive printing compositions of the invention had a viscosity suitable for use in conventional printing processes. Furthermore, the sample with 4.5 ml of food dye follows a similar trend to the sample with 3 ml food dye, as well as the sample with double the amount of PVP (4 ml PVP versus 2 ml PVP) from the stock solution.

Figure 9:
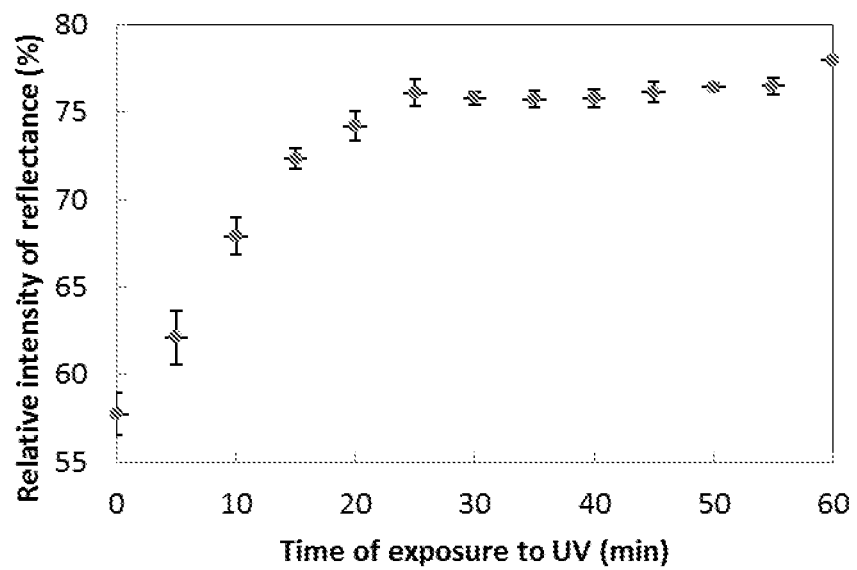
FIG. 9 shows the average reflectance intensity of peak at 630 nm versus time of exposure to UV for 5 samples comprising photosensitive layers obtained from inkjet printing the same composition (a composition comprising 2.53 mg/ml brilliant blue FCF, 18.4 mg/ml TiO$_2$ and 123 mg/ml PVP dispersed in water). The standard deviation is 5%.

The next step was to investigate the rate of decolouration of the photosensitive layers obtained from inkjet printing. As an example, changes in the reflectance spectra of the layer obtained from inkjet printing as a result of exposure to UV as well as kinetic of photodegradation of this layer is shown in FIGS. 6a and b, respectively. The printing composition used to form the layer comprised 0.45 mg/ml brilliant blue FCF, 4 mg/ml $TiO_2$ and 26.67 mg/ml PVP dispersed in water. The reflectance spectra was measured at 5 minute intervals of UV exposure. FIG. 6a shows the measurements taken after intervals of 0, 15, 30, 45 and 60 minutes of UV exposure. As can be seen in FIG. 6a, the reflectance peak at 630 nm decreases over time with exposure to UV, resulting in a concomitant loss of the blue colour. Furthermore, it can be seen in FIG. 6b that the change in the reflectance of the layer obtained from inkjet printing at 630 nm over exposure to UV could be fitted to first order kinetic law with a rate constant of 0.0852 ($min^{-1}$). The sample exhibited essentially complete decolouration in 25 min. The relative standard deviation for decolouration of the same layer is less than 5% for 5 layers prepared independently on separate days, an indication that the fabrication method using inkjet printing is reproducible (see FIG. 9).

The decolouration of the photosensitive layers obtained from inkjet printing provides information of the extent of UV exposure time. The minimal erythema dose (measure of the erythemal effective radiant exposure that produces a just noticeable erythema on the skin of an individual) differs for different skin types, i.e. fair or dark [Ireland, N.S.A.O., *Measurement and assessment of personal exposures to incoherent optical radiation-part 3: UV-radiation emitted by the sun, I.S.EN* 14255-3:2008. 2008]. It would therefore be advantageous to be able to adjust the decolouration rate of sun-exposure sensors to match different skin types or the application of sunscreens with different Sun Protection Factor (SPF). In this regard, different parameters for inkjet printing the photosensitive layer were explored in an attempt to alter the UV degradation time. Several parameters were adjusted including the ratio of food dye to titanium dioxide, different polymorphs of titanium dioxide (P25, anatase and rutile), and the thickness of the photosensitive layer, to assess the effect on the rate of decolouration. In one experiment three printing compositions comprising different titanium dioxide to food dye weight ratios (15.5:1, 4.54:1 and 3.03:1) were prepared and a photosensitive layer printed by inkjet printing. The three compositions contained:
18.46 mg/ml of $TiO_2$, 1.20 mg/ml brilliant blue FCF and 123 mg/ml of PVP in water (dry weight ratio of titanium dioxide to food dye 15.5:1)
2.67 mg/ml of $TiO_2$, 0.58 mg/ml brilliant blue FCF and 177.78 mg/ml of PVP in water (dry weight ratio of titanium dioxide to food dye 4.54:1)
1.77 mg/ml of $TiO_2$, 0.79 mg/ml brilliant blue FCF and 160 mg/ml of PVP in water (dry weight ratio of titanium dioxide to food dye 3.03:1).

Figure 10:
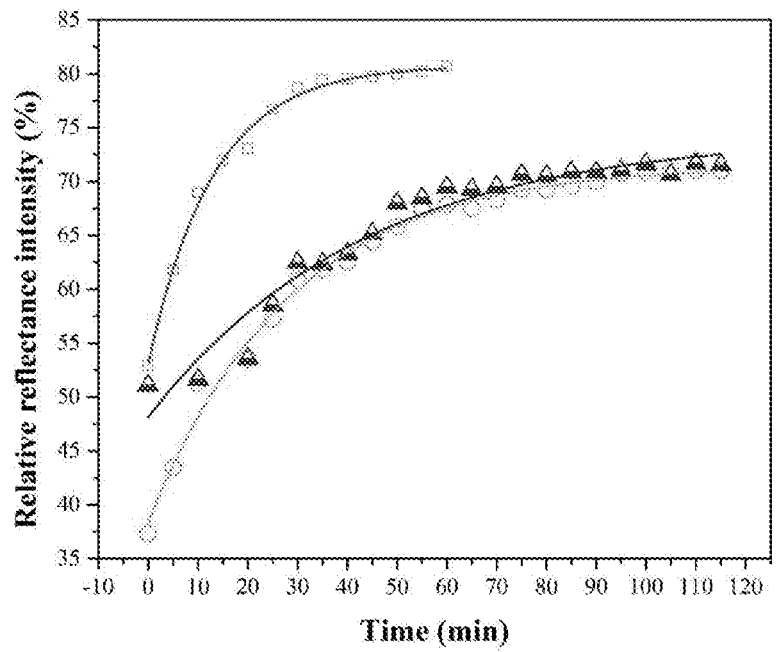
FIG. 10 shows the reflectance intensity of peak at 630 nm versus time of exposure to UV along with first order kinetic fitting for photosensitive layers obtained from inkjet printing compositions with a titanium dioxide to food dye weight ratio of (circle) 15.5:1, (triangle) 4.54:1 and (square) 3.03:1.
Figure 11:
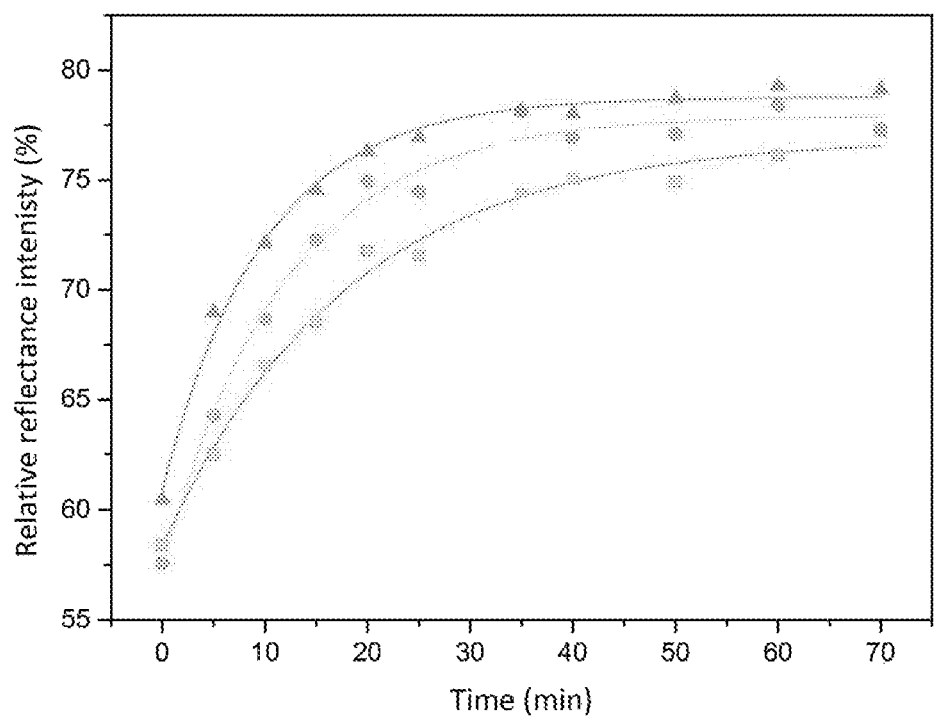
FIG. 11 shows the reflectance intensity of peak at 630 nm versus time of exposure to UV along with first order kinetic fitting for photosensitive layers obtained from inkjet printing compositions comprising the same amounts of brilliant blue FCF, TiO$_2$, and PVP in water (a composition comprising 2.53 mg/ml brilliant blue FCF, 18.4 mg/ml TiO$_2$ and 123 mg/ml PVP dispersed in water) with different polymorphs of titanium dioxide: (■) anatase, (•) P25 (anatase & rutile) and rutile (▲).

The relative reflectance intensity of the peak at 630 nm as a function of UV exposure time over time was measured and the results are shown in FIG. 10. In another experiment, photosensitive layers were obtained by inkjet printing compositions comprising the same amounts of brilliant blue FCF, $TiO_2$, and PVP in water (0.45 mg/ml brilliant blue FCF, 4 mg/ml $TiO_2$ and 26.67 mg/ml PVP dispersed in water) with different polymorphs of titanium dioxide (anatase, P25 (anatase & rutile) and rutile), and the relative reflectance intensity of the peak at 630 nm as a function of UV exposure time over time was measured. The results are shown in FIG. 11. Considering the kinetic profiles of the plots of relative reflectance intensity of the peak at 630 nm as a function of UV exposure time, it is apparent that these variables have a limited impact on the decolouration time. In the case of changing the ratio of $TiO_2$ to food dye between ~15 and 4, the rate of degradation appeared to be similar. However, as the ratio of $TiO_2$ to food dye decreases, the photodegradation reaction did not reach completion. This result indicates that there is a minimum threshold of $TiO_2$ necessary to obtain the desired complete decolouration.

Figure 12:
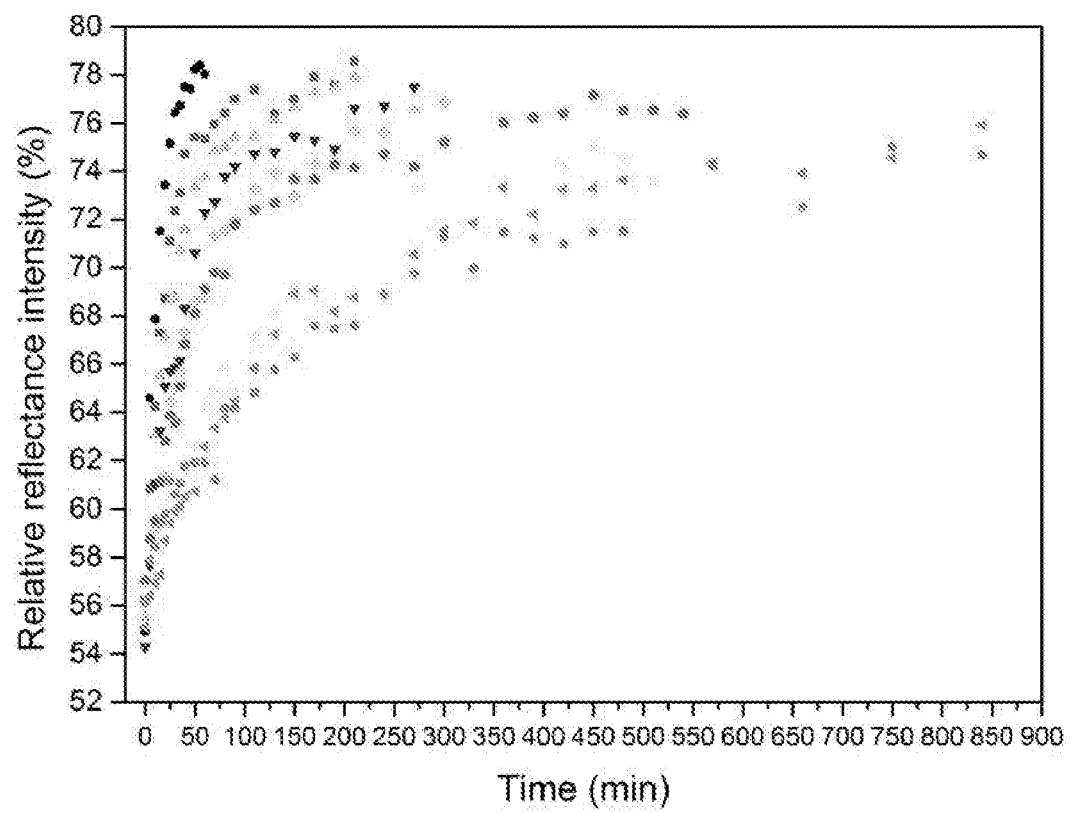
FIG. 12 shows reflectance intensity of peak at 630 nm versus time of exposure to UV for photosensitive layers obtained from inkjet printing of a composition comprising 0.45 mg/ml brilliant blue FCF, 4 mg/ml TiO$_2$ and 26.67 mg/ml PVP dispersed in water (•) without any UV neutral density filter, or with a (✻) 0.3ND (70% transmittance), ( ) 0.5ND (35% transmittance), (▼) 0.8ND (25% transmittance), (✳) 1ND (15% transmittance), (✻) 1.3ND (10% transmittance), ( ) 1.5ND (6% transmittance), (✺) 1.8ND (4% transmittance), or (✻) 2ND (1.5% transmittance) UV neutral density filter.

It has been reported previously that in aqueous systems, the kinetics of the photodegradation of food dyes depends on parameters of the solution, such as the concentration of food dye versus titanium dioxide and the pH of the solution. In contrast to aqueous systems, it has been reported that these parameters (concentration and pH) do not play significant roles in the degradation kinetic in the solid state. This difference is related to the rate-controlling effect of diffusion and mass transport in an aqueous system which does not play a role in a solid system. As photodegradation in the photosensitive layer is occurring in the solid-state, the change in kinetics are not observed. Another way to alter the kinetics of the degradation rate is to modify the amount of light that reaches the layer. This was achieved by applying ND UV filters on top of the photosensitive layer. Samples comprising a photosensitive layer were prepared by inkjet printing of a composition comprising 0.45 mg/ml brilliant blue FCF, 4 mg/ml $TiO_2$ and 26.67 mg/ml PVP dispersed in water. The relative reflectance intensity of the peak at 630 nm as a function of UV exposure time over time was then measured for a sample without any UV neutral density filter, and for samples with a 0.3ND (70% transmittance), a 0.5ND (35% transmittance), a 0.8ND (25% transmittance), a 1ND (15% transmittance), a 1.3ND (10% transmittance), a 1.5ND (6% transmittance), a 1.8ND (4% transmittance) or a 2ND (1.5% transmittance) UV neutral density filter placed between the light source and the photosensitive layer. The results are shown in FIG. 12.

It can be seen that ND UV filters can successfully alter the decolouration time of the photosensitive layers.

The effects of different parameters of photosensitive layers obtained from inkjet printing, as well as the effect of different ND UV filters, on rate constant and half-life of decolouration obtained from first order kinetic fitting are reported in Table 1.

TABLE 1

Effect of different variables of photosensitive layers obtained from inkjet printing on the kinetic parameters of their photodegradation which followed first order kinetic law.

| Kinetic parameters Sample | | First order rate constant of photodegradation, k in equation (min$^{-1}$) y = y$_0$ + aexp(-kx) | Half life time of photodegradation (min) T$_{1/2}$ = ln2/k | Visually decolouration of layer (~74% reflectance in the wavelength of 630 nm (min) |
|---|---|---|---|---|
| Model sample* | | 0.082 | 8.40 | 20 |
| Ratio of TiO$_2$/dye | TiO$_2$/dye = 4.54 | 0.035 | 19.82 | Didn't decolour completely |
| | TiO$_2$/dye = 3.03 | 0.032 | 21.27 | Didn't decolour completely |
| Using different polymorphs of TiO$_2$ | Anatase | 0.055 | 12.55 | 35 |
| | Rutile | 0.101 | 6.87 | 15 |
| Thickness | Once printing | 0.077 | 9.04 | 25 |
| | 3 times printing | 0.073 | 9.42 | 25 |
| | 4 times printing | 0.069 | 10.98 | 30 |
| | 5 times printing | 0.076 | 9.10 | 30 |
| Using ND UV filters | 0.3ND | 0.047 | 14.76 | 35 |
| | 0.5ND | 0.035 | 19.56 | 60 |
| | 0.8ND | 0.026 | 26.66 | 80 |
| | 1ND | 0.019 | 36.54 | 130 |
| | 1.3ND | 0.015 | 45.45 | 170 |
| | 1.5ND | 0.008 | 86.11 | 330 |
| | 1.8ND | 0.006 | 114.06 | 480 |
| | 2 ND | 0.004 | 178.65 | 570 |

*Properties of model sample: TiO$_2$/dye ratio = 15.5 Aeroxide P25 (anatase + rutile) Twice printed Without any ND UV filter As is evident from Table 1, by altering different printing parameters, the half life time of photodegradation varies in the range of 8-21 min, while for the case of using ND UV filters, this range could be altered between to 8-178 min. Apart from half life time of photodegradation, another term referred to as the "decolouration time" is reported in Table 1 for all layers. The decolouration time is the time that the photosensitive layer was deemed colourless to the naked eyes, which equated to 74% relative reflectance at 630 nm. In other words, reaching relative reflectance of around 74% from the initial value of around 30-40% (depending on the ratio of the food dye to titanium dioxide) at 630 nm is considered as the decolouration time. A decolouration time between 15 to 30 min could be achieved through modifying different printing parameters for layers obtained from inkjet printing. By employing ND UV filters, these ranges can be extended up to 570 min. Therefore, ND UV filters are good candidates for tuning the behaviour of the UV sensors for different exposure levels (e.g. for different skin types) as the exact same photosensitive layer can be fabricated and then a different laminating coat of a ND UV filter can be applied in order to prepare sun-exposure sensors for different exposure levels.

The next step was to correlate each of these sun-exposure sensors, obtained from photosensitive layers equipped with different ND UV filters, for the different skin types and sunscreens. Table 2 shows an estimate of the safe sun exposure time for different skin types to which sunscreen of different SPF factor was applied [Ireland, N.S.A.O., *Measurement and assessment of personal exposures to incoherent optical radiation-part 3: UV-radiation emitted by the sun.* 2008]. Also shown is the decolouration of each sun-exposure sensor (time for the layers to reach ~74% reflectance at 630 nm). The table shows that using ND UV filters, the photo-sensitive layer made in the exact same way can have decolouration times that correlate with a broad range of sun exposure times for different skin types and different SPF factor sunscreens.

TABLE 2

Table of the decolouration time for a photosensitive layer using different UV neutral density filters and the associated estimated safe sun exposure time for different skin types with sunscreens of SPF (sun protection factor) ranging from 10 to 50 applied.

| Type of sun-exposure sensor | decolouration time = safe time in the sun | Very Fair | Fair | Light | Medium | Dark |
|---|---|---|---|---|---|---|
| 0.5ND + layer | 1 hour | SPF 20 | SPF 20 | SPF 0-10 | SPF 10 | SPF 0-10 |
| 1ND + layer | 2 hours | SPF 30 | SPF 30 | SPF 30 | SPF 20 | SPF 0-10 |
| 1.3ND + layer | 3 hours | SPF 40 | SPF 30 | SPF 30 | SPF 20 | SPF 0-20 |
| | 4 hours | SPF 40 | SPF 40 | SPF 30 | SPF 30 | SPF 0-20 |
| 1.5ND + layer | 5 hours | SPF 50 | SPF 50 | SPF 40 | SPF 30 | SPF 0-20 |

Figure 13:
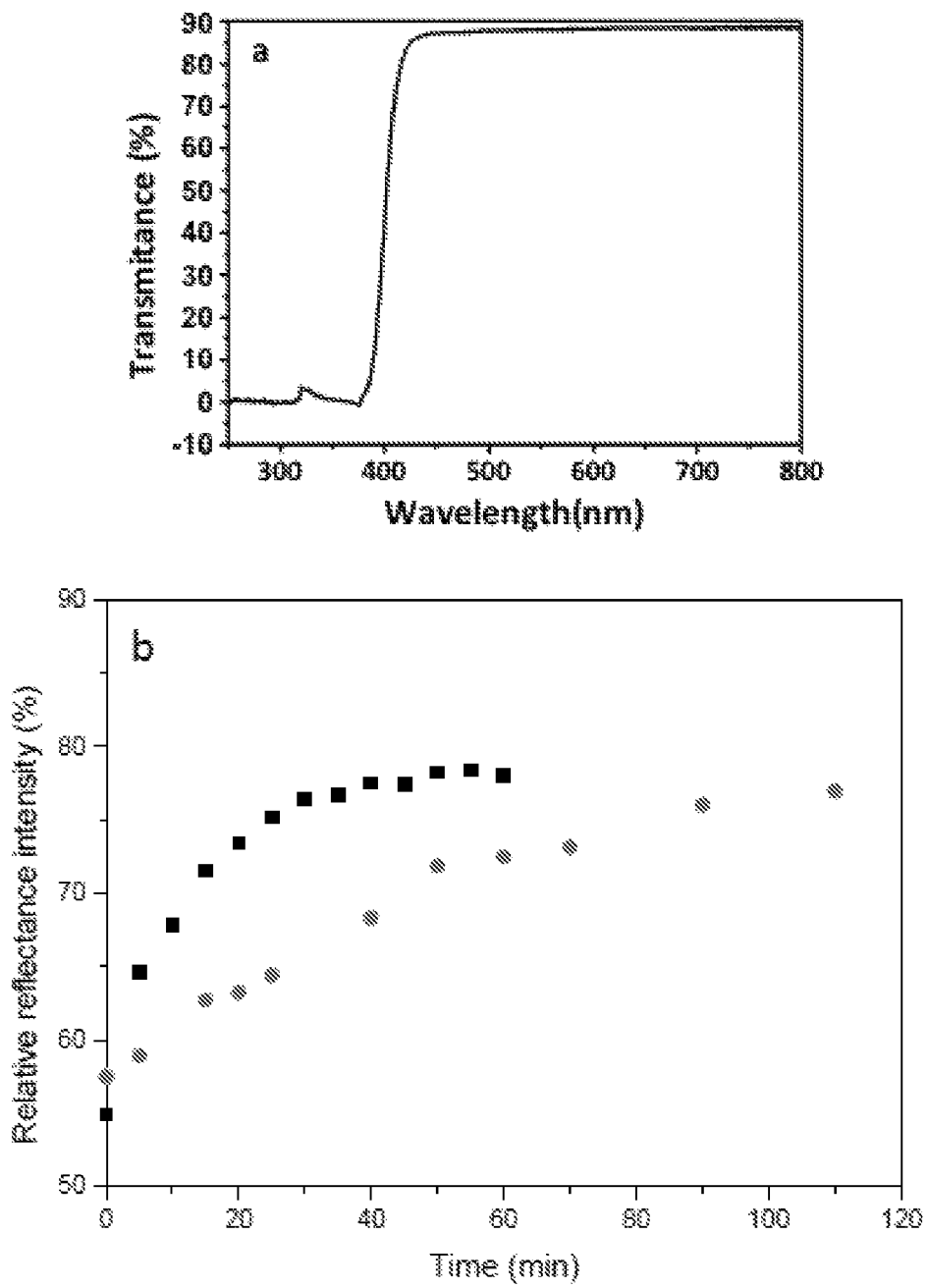
FIG. 13 shows at a) the transmittance spectra of flexible thin film UV absorber from Edmund Optics, and at b) the reflectance intensity of peak at 630 nm versus time of exposure to UV of the layer obtained from inkjet printing of a composition comprising 0.45 mg/ml brilliant blue FCF, 4 mg/ml TiO$_2$ and 26.67 mg/ml PVP dispersed in water (■) without any UV filter, or (•) with flexible thin film UV absorber from Edmund Optics.
Figure 14:
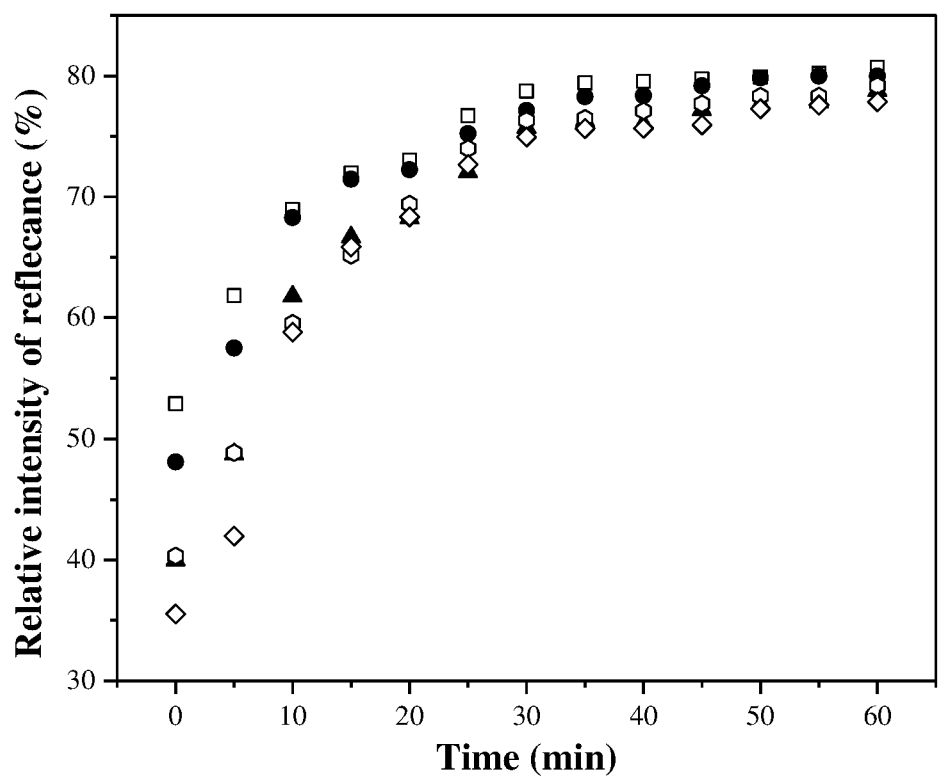
FIG. 14 shows reflectance intensity of peak at 630 nm versus time of exposure to UV for layers obtained from once (□), twice (•), 3 times (▲), 4 times (○) and 5 times (◊) inkjet printing with the same composition (a composition comprising 2.53 mg/ml brilliant blue FCF, 18.4 mg/ml TiO$_2$ and 123 mg/ml PVP dispersed in water).

In a further experiment, a flexible thin film UV filter from Edmund Optics was laminated on the top of the photosensitive layer to see its effect on its decolouration. As shown in FIG. 13, this flexible UV filter with 20% reflectance is successful in increasing decolouration time of the photosensitive layer, demonstrating that flexible UV filters with the ability of blocking UV in the ranges obtained from ND UV filters, can be laminated on the top of the photosensitive layers obtained from inkjet printing in order to calibrate them to match UV exposure time of different skin types.

Another alternative may be to use a circular polarizing filter. The transmittance of a circular polarizer can be tuned in the range of 10% to 35% by rotating the circular polarizer. Therefore, the decolouration time of the photosensitive layer obtained from inkjet printing can be calibrated to match different skin types by rotating a circular polarizer on the top of it.

Photosensitive layers comprising the photocatalyst Aeroxide P25 $TiO_2$ and food grade dyes can be obtained from inkjet printing which are suitable for the preparation of a sun-exposure sensor. In particular, brilliant blue FCF food dye showed a significant colour change and is therefore a suitable colouring agent for fabrication of a sun exposure sensor. The decolouration of the photosensitive layer can be altered to match different skin types, by blocking incident light by different ND UV filters. In this way, the decolouration of these layers can be altered in the range of 1 to 5 hours. This strategy can be applied to calibrate the sun-exposure sensor for different exposure levels or skin types and fabricate a sun-exposure sensor to match all skin types.

Advantageously, the present invention allows for the preparation of easy to use and easy to make sun-exposure sensors prepared via the inkjet printing of, for example, a composition comprising titanium dioxide ($TiO_2$), polyvinyl propylene (PVP) and food grade dye on paper. These sun exposure sensors work by employing the titanium dioxide ($TiO_2$) as a photocatalyst to degrade the food dyes resulting in gradual decolouration of this layer. The PVP serves as a film forming agent to allow layer formation. The decolouration can be observed by the naked eye or quantitative monitored using UV-Vis reflectance spectra. Finally, decolouration of the layers can be calibrated to match UV exposure time of different skin types, by using different UV neutral density filters with the ability of transmit between 1.5 to 70% of the irradiant UV light from the sources to the photoactive layer.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A photosensitive inkjet printing composition comprising:
   a photocatalyst which exhibits a photocatalytic effect when exposed to UV and/or visible radiation, wherein the photocatalyst is a metal oxide nanoparticle having a particle size in the range of about 10 to 50 nm;
   (ii) a colouring agent that exhibits a colour change in response to the photocatalytic effect; and
   (iii) a film forming agent;
   wherein the composition has a viscosity of about 0.001 to about 0.01 Pa·s at 25° C.

2. The photosensitive inkjet printing composition according to claim 1, wherein the composition has a viscosity of about 0.001 to 0.005 Pa. s at 25° C.

3. The photosensitive inkjet printing composition according to claim 1, wherein the metal oxide nanoparticle is a $TiO_2$ nanoparticle.

4. The photosensitive inkjet printing composition according to claim 3, wherein the composition comprises $TiO_2$ nanoparticles in a concentration of from 0.1 mg/mL to 30 mg/mL.

5. The photosensitive inkjet printing composition according to claim 3, wherein the $TiO_2$ nanoparticles have a particle size in the range of about 20 to 30 nm.

6. The photosensitive inkjet printing composition according to claim 1, wherein the colouring agent is a food dye.

7. The photosensitive inkjet printing composition according to claim 6, wherein the food dye is selected from the group consisting of fast green For Coloring Food (FCF) and brilliant blue For Coloring Food (FCF).

8. The photosensitive inkjet printing composition according to claim 1, wherein the film forming agent is a polymer selected from the group consisting of xanthan gum, poly(N-isopropylacrylamide), polyethylene glycol (PEG), polyvinyl alcohol (PVA), polyvinylpyrrolidone (PVP), polyacrylic acid, polymethacrylic acid, poly(hydroxyethyl methacrylate), polyacrylamide, polyethylene glycol, polypropylene glycol, or any combination thereof.

9. The photosensitive inkjet printing composition according to claim 8, wherein the polymer is polyvinylpyrrolidone (PVP).

10. A sun-exposure sensor comprising:
    a photosensitive layer inkjet printed on a surface of a support, the photosensitive layer comprising:
    a photocatalyst which exhibits a photocatalytic effect when exposed to UV and/or visible radiation, wherein the photocatalyst is a metal oxide nanoparticle having a particle size in the range of about 10 to 50 nm;
    (ii) a colouring agent that exhibits a colour change in response to the photocatalytic effect;
    (iii) a film forming agent, and
    (iv) a filter layer disposed on the photosensitive layer.

11. The sun-exposure sensor according to claim 10, wherein the photosensitive layer has a thickness of less than 100 μm.

12. The sun-exposure sensor according to claim 11, wherein the thickness of the photosensitive layer is in the range of from about 1 μm to 50 μm.

13. The sun-exposure sensor according to claim 10, wherein the support is in the form of a sheet comprised of a material selected from the group consisting of plastic, paper, cloth, composite materials, metallic films and cellophane.

14. The sun-exposure sensor according to claim 13, wherein the support is paper having an upper surface and a lower surface.

15. The sun-exposure sensor according to claim 14, wherein the photosensitive layer is on the upper surface of the paper and has an adhesive layer on the lower surface.

16. The sun-exposure sensor according to claim 10, wherein the filter layer is a neutral density filter layer.

* * * * *